(12) United States Patent
Lemmers, Jr. et al.

(10) Patent No.: US 11,143,286 B2
(45) Date of Patent: *Oct. 12, 2021

(54) DIFFERENTIAL UNIT GEAR SHROUDS

(71) Applicant: Hamilton Sundstrand Corporation, Charlotte, NC (US)

(72) Inventors: Glenn C. Lemmers, Jr., Loves Park, IL (US); Derek R. Hochstetler, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/355,356

(22) Filed: Mar. 15, 2019

(65) Prior Publication Data
US 2020/0292056 A1    Sep. 17, 2020

(51) Int. Cl.
*F16H 57/04* (2010.01)
*F16H 57/037* (2012.01)
*F16H 57/02* (2012.01)

(52) U.S. Cl.
CPC ......... *F16H 57/0409* (2013.01); *F16H 57/02* (2013.01); *F16H 57/037* (2013.01); *F16H 57/0423* (2013.01); *F16H 57/0483* (2013.01); *F16H 2057/02034* (2013.01)

(58) Field of Classification Search
CPC ........ F16H 57/02; F16H 57/031; F16H 57/04; F16H 57/0421; F16H 57/0423; F16H 61/16; F16H 57/0483; F16H 2057/02034; F16H 57/0409; F01D 5/225
See application file for complete search history.

(56) References Cited

U.S. PATENT DOCUMENTS

| 7,712,581 | B2* | 5/2010 | Billings | F16H 57/0489 184/13.1 |
| 9,879,773 | B2* | 1/2018 | Slayter | F16H 57/0423 |
| 9,989,143 | B2 | 6/2018 | Fomison | |
| 2006/0179973 | A1* | 8/2006 | Matsufuji | F16H 57/0447 74/606 R |
| 2008/0072703 | A1* | 3/2008 | Billings | F16H 57/0489 74/606 R |
| 2014/0260790 | A1* | 9/2014 | Passino | F16H 57/0409 74/606 R |
| 2016/0290396 | A1 | 10/2016 | Lemmers, Jr. et al. | |
| 2017/0146112 | A1 | 5/2017 | Anglin et al. | |
| 2018/0238434 | A1* | 8/2018 | Zhang | F16H 57/05 |

FOREIGN PATENT DOCUMENTS

DE    102014115517 A1    5/2016
EP    1128095 A1    8/2001

OTHER PUBLICATIONS

Extended European Search Report dated Mar. 13, 2020, issued during the prosecution of European Patent Application No. EP 19214545.6.

\* cited by examiner

*Primary Examiner* — Prasad V Gokhale
(74) *Attorney, Agent, or Firm* — Locke Lord LLP; Joshua L. Jones; Gabrielle L. Gelozin

(57) ABSTRACT

A gear shroud arrangement includes a mounting plate defining an aperture therethrough. A first cylindrical shroud is included having a first end and an opposed second end, wherein the first end of the first shroud is connected to an outer periphery of the mounting plate and is aligned with the aperture. A backing plate is mounted to the second end of the first shroud. A second cylindrical shroud extends from the backing plate in a direction opposite the first shroud.

14 Claims, 6 Drawing Sheets

DIFFERENTIAL UNIT GEAR SHROUDS

BACKGROUND OF THE INVENTION

1. Field of the Invention

The present disclosure relates to gear shrouds, and more particularly to gear shrouds for gears Integrated Drive Generators (IDGs).

2. Description of Related Art

Generators are connected to gas turbine engines so that aircraft can generate on board electricity. In order to produce useful power, generators need to be driven at a substantially constant speed. To drive a generator at a constant speed using a gas turbine engine that runs at very different speeds at different stages in a flight, a constant speed drive (CSD) can be connected between the gas turbine engine and the generator. A CSD is a type of transmission that reduces the range of speed at its input to a much narrower range of speed at its output to provide a nearly constant output speed over a range of input speeds. A CSD and generator can be integrated together into a single unit called an IDG.

The conventional techniques have been considered satisfactory for their intended purpose. However, there is an ever present need for improved CSDs and IDGs. This disclosure provides a solution for this need.

SUMMARY OF THE INVENTION

A gear shroud arrangement includes a mounting plate defining an aperture therethrough. A first cylindrical shroud is included having a first end and an opposed second end, wherein the first end of the first shroud is connected to an outer periphery of the mounting plate and is aligned with the aperture. A backing plate is mounted to the second end of the first shroud. A second cylindrical shroud extends from the backing plate in a direction opposite the first shroud.

The first shroud can extend clockwise from a position between a 12 o'clock position and a 1 o'clock position as viewed toward the mounting plate and a 6 o'clock position relative to the 12 o'clock position. The second shroud can extend clockwise from the 12 o'clock position as viewed toward the mounting plate and a position between a 3 o'clock position and a 4 o'clock position relative to the 12 o'clock position. The mounting plate can define an off-center aperture therethrough between a 3 o'clock position and a 6 o'clock position relative to the 12 o'clock position. The off-center aperture can have a generally lunate shape with a nose extending toward a center axis of the mounting plate from the generally lunate shape. The mounting plate can include a riser tube extending about the aperture and extending in a direction away from the backing plate.

The second shroud can include a first step and a second step extending further from the backing plate than the first step. The first and second steps can meet at a position between the 12 o'clock position and a 1 o'clock position relative to the 12 o'clock position. The second step can extend clock-wise from the first step. A mounting flange with a fastener aperture can extend from the second shroud where the first and second steps meet.

An IDG housing can be included, wherein the mounting flange is engaged to an outer housing wall of the IDG housing. The mounting plate can define a plurality of fastener apertures therethrough. A differential unit can be mounted to the mounting plate by fasteners engaged in the fastener apertures. The mounting plate, first shroud, second shroud, and backing plate can form a first gear shroud portion and an opposed gear shroud portion can be engaged with the first gear shroud portion and with the differential unit to form a complete gear shroud for the differential unit. Each of the mounting plate and backing plate of each of the gear shroud portions can include a concave notch proximate the 12 o'clock position.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
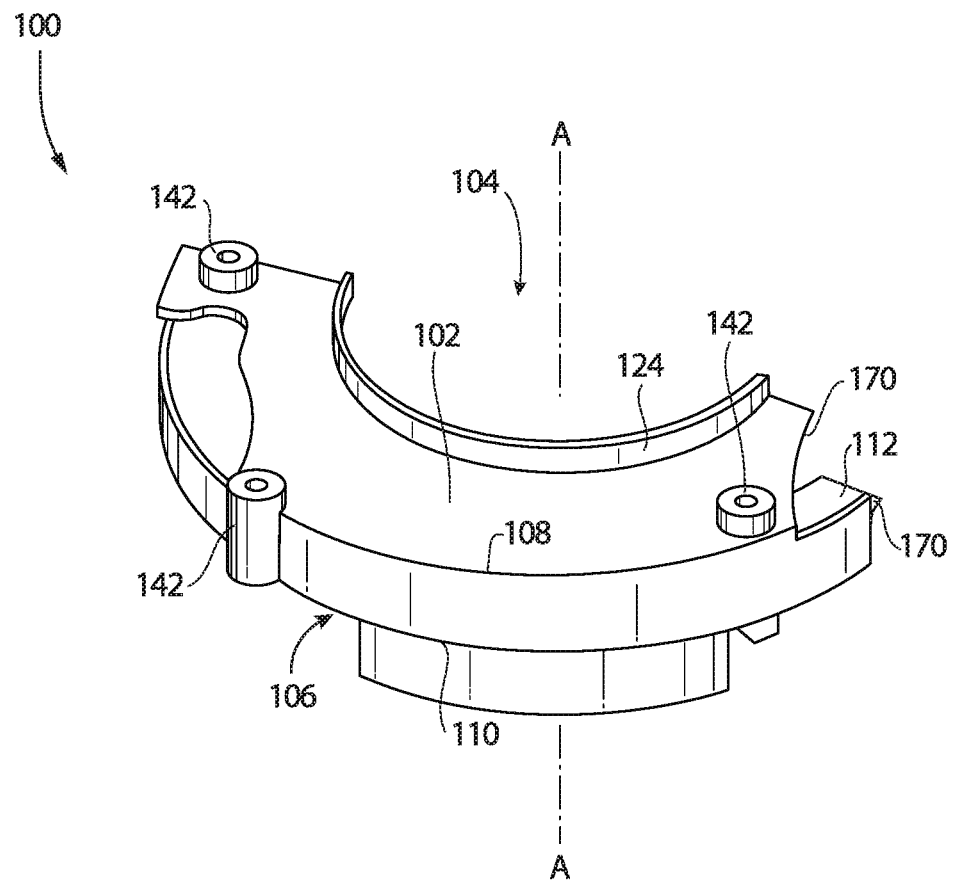
FIG. 1 is a perspective view of an exemplary embodiment of a gear shroud portion constructed in accordance with the present disclosure, showing the mounting plate and backing plate.

Reference will now be made to the drawings wherein like reference numerals identify similar structural features or aspects of the subject disclosure. For purposes of explanation and illustration, and not limitation, a partial view of an exemplary embodiment of a gear shroud arrangement in accordance with the disclosure is shown in FIG. 1 and is designated generally by reference character 100. Other embodiments of gear shrouds in accordance with the disclosure, or aspects thereof, are provided in FIGS. 2A-6, as will be described. The systems and methods described herein can be used to shroud gears in IDGs to reduce the amount of oil churning, which improves IDG efficiency and scavenge pump performance, thus improving the IDG oil servicing range.

The gear shroud arrangement 100 includes a mounting plate 102 defining a semi-circular aperture 104 therethrough. A first cylindrical shroud 106 is included having a first end 108 and an opposed second end 110. The first end 108 of the first shroud 106 is connected to an outer periphery of the mounting plate 102 and is aligned with the aperture 104 relative to the axis A defined by the mounting plate 102. A backing plate 112 is mounted to the second end 110 of the first shroud 106. A second cylindrical shroud 114 extends from the backing plate 112 in a direction opposite the first shroud 106, i.e., the first shroud 106 extends upward from the backing plate 112 as oriented in FIG. 1 and the second shroud 114 extends downward.

Figure 2A:
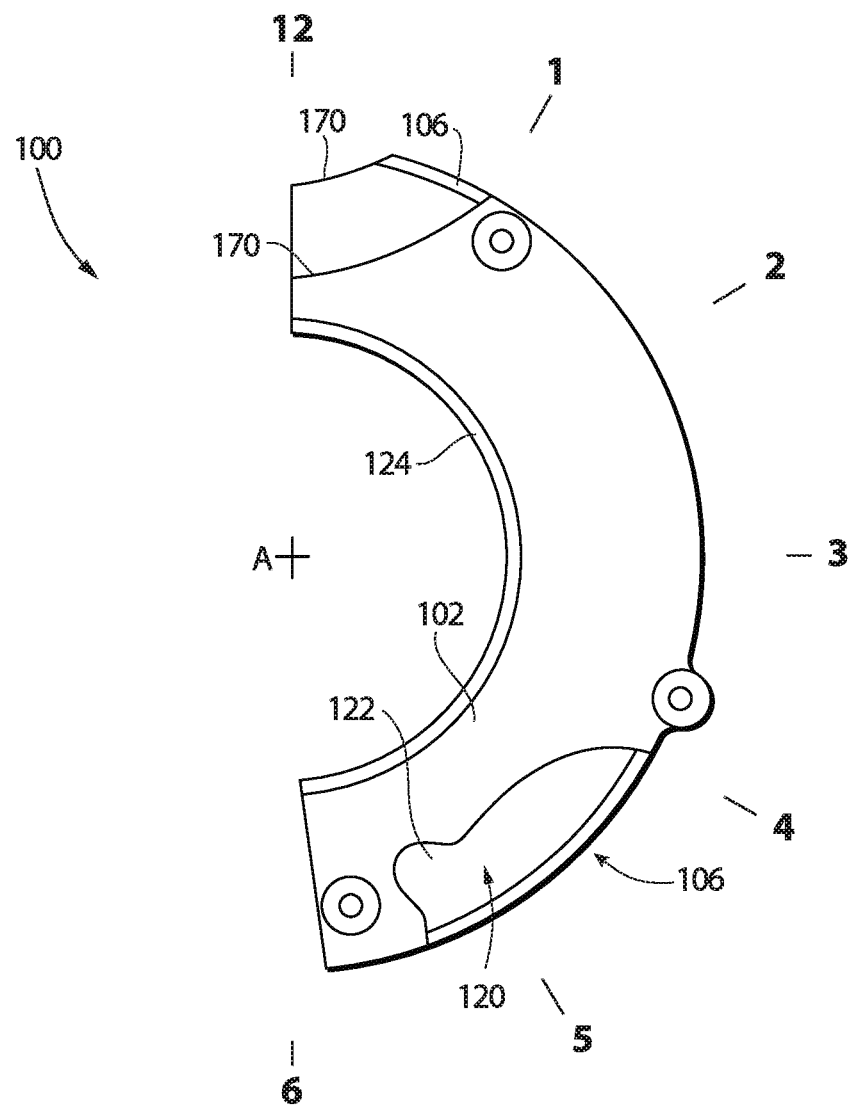
FIG. 2A is a plan view of the gear shroud of FIG. 1, showing the mounting plate.
Figure 2B:
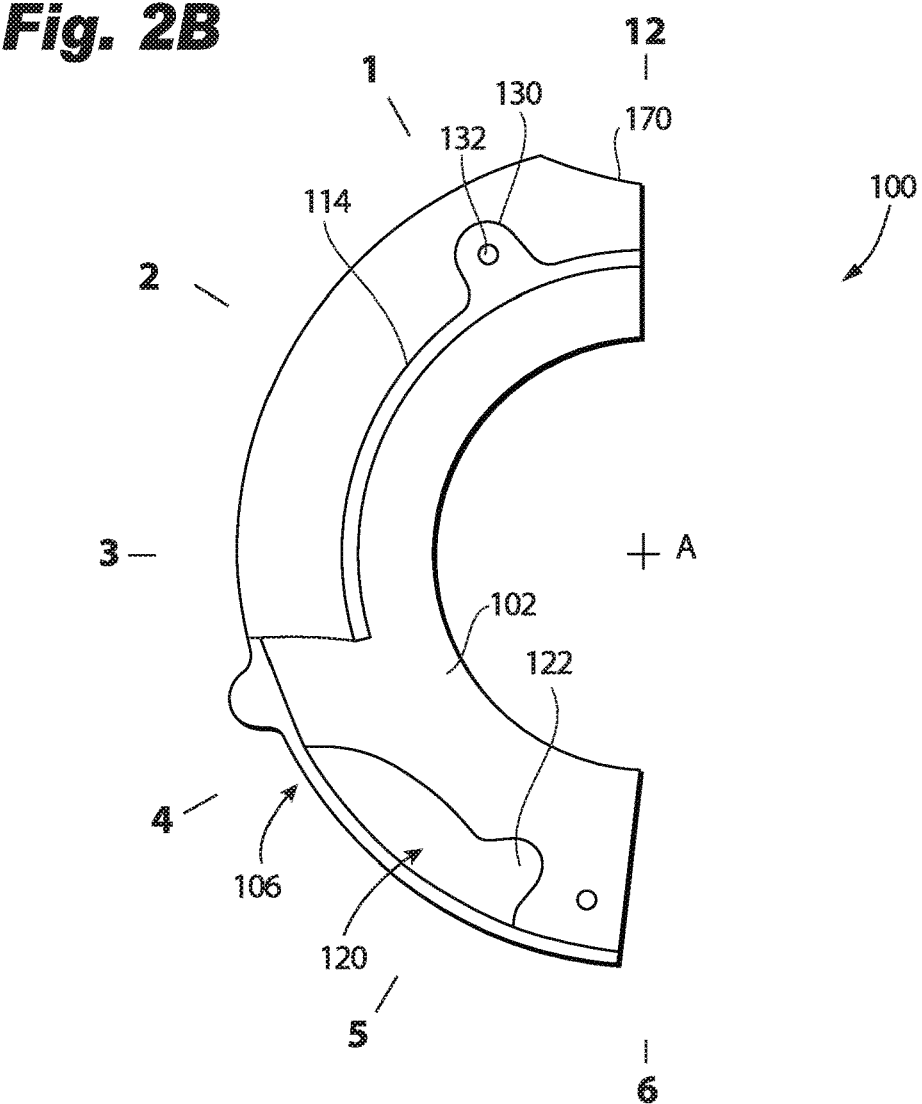
FIG. 2B is a plan view of the gear shroud of FIG. 1, showing the backing plate viewed from the opposite direction from FIG. 2A.

With reference now to FIG. 2A, the first shroud 106 extends clockwise from a first position between a 12 o'clock position and a 1 o'clock position as viewed toward the mounting plate and a 6 o'clock position relative to the 12 o'clock position. As shown in FIG. 2B (which is flipped relative to FIG. 2A so that clockwise and counter-clockwise directions are reversed), the second shroud 114 extends clockwise from the 12 o'clock position and a position between a 3 o'clock position and a 4 o'clock position relative to the 12 o'clock position. The mounting plate defines an off-center aperture 160 therethrough between a 3 o'clock position and a 6 o'clock position relative to the 12 o'clock position. The off-center aperture 160 has a generally lunate shape with a nose 122 extending toward a center axis A of the mounting plate 102 from the generally lunate shape. The mounting plate 102 includes a riser tube 124 extending about the aperture 104 and extending in a direction away from the backing plate 112, i.e., extending upward as oriented in FIG. 1.

Figure 3:
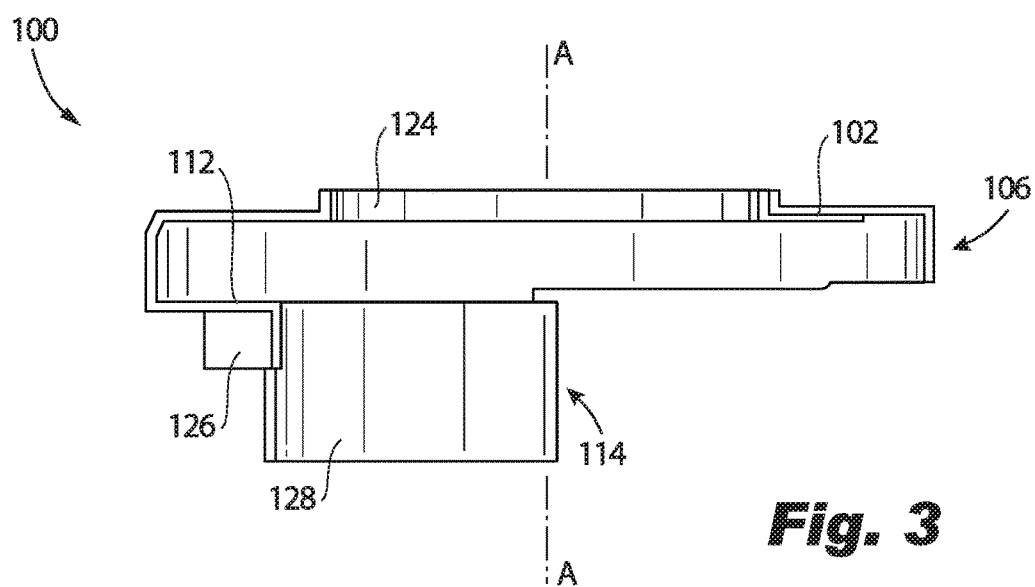
FIG. 3 is a side-elevation view of the gear shroud of FIG. 1, showing the step in the second shroud.

With reference now to FIG. 3, the second shroud 114 includes a first step 126 and a second step 128 extending further from the backing plate 112 than the first step 126. The first and second steps 126, 128 meet at a position between the 12 o'clock position and a 1 o'clock position relative to the 12 o'clock position, as shown in FIG. 2B. The second step 128 extends clock-wise from the first step 126. A mounting flange 130 with a fastener aperture 132 extends from the second shroud 114 where the first and second steps 126, 128 meet.

Figure 4:
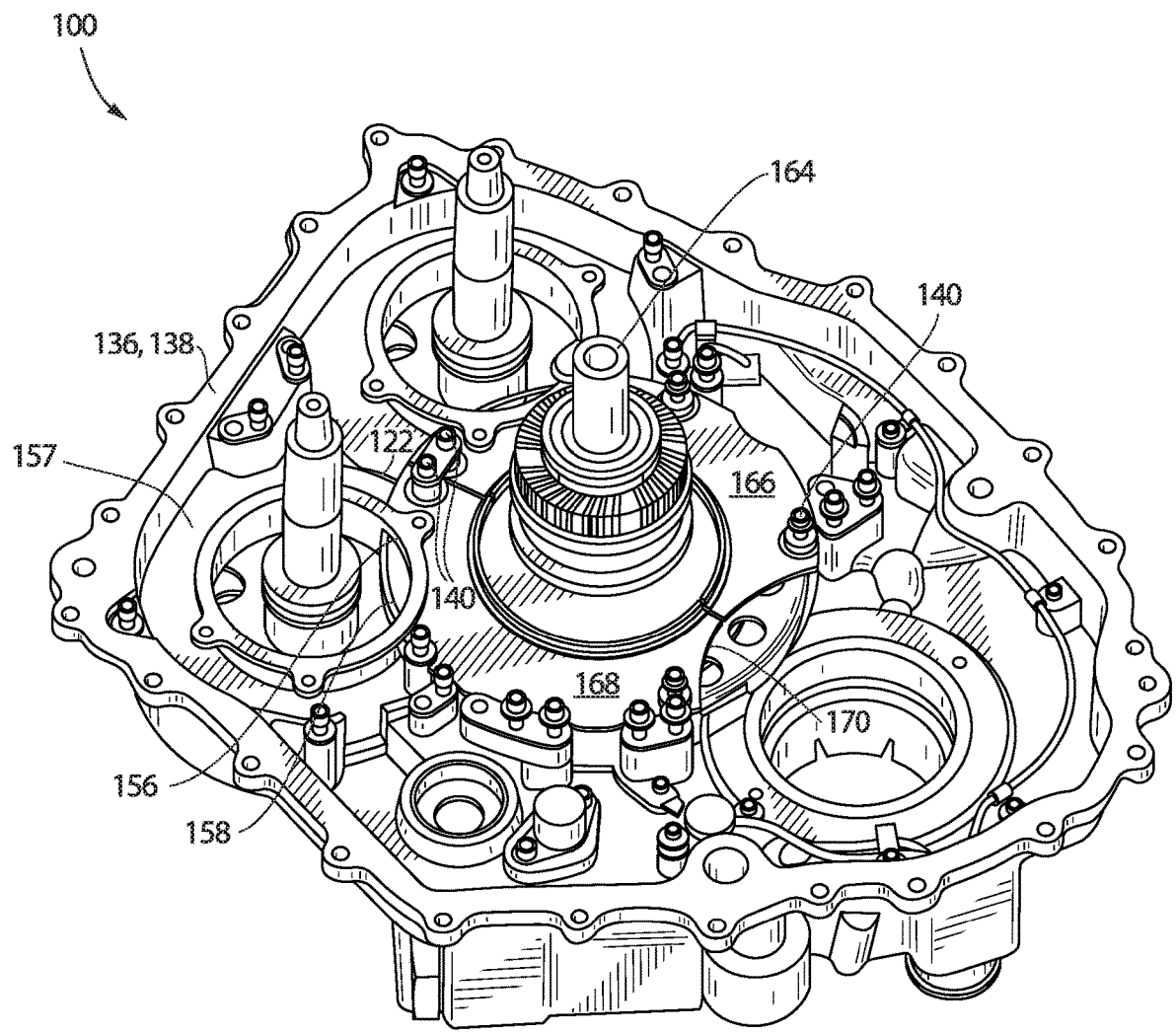
FIG. 4 is a perspective view of the gear shroud of FIG. 1, showing the gear shroud engaged with the outer wall of an IDG housing.
Figure 5:
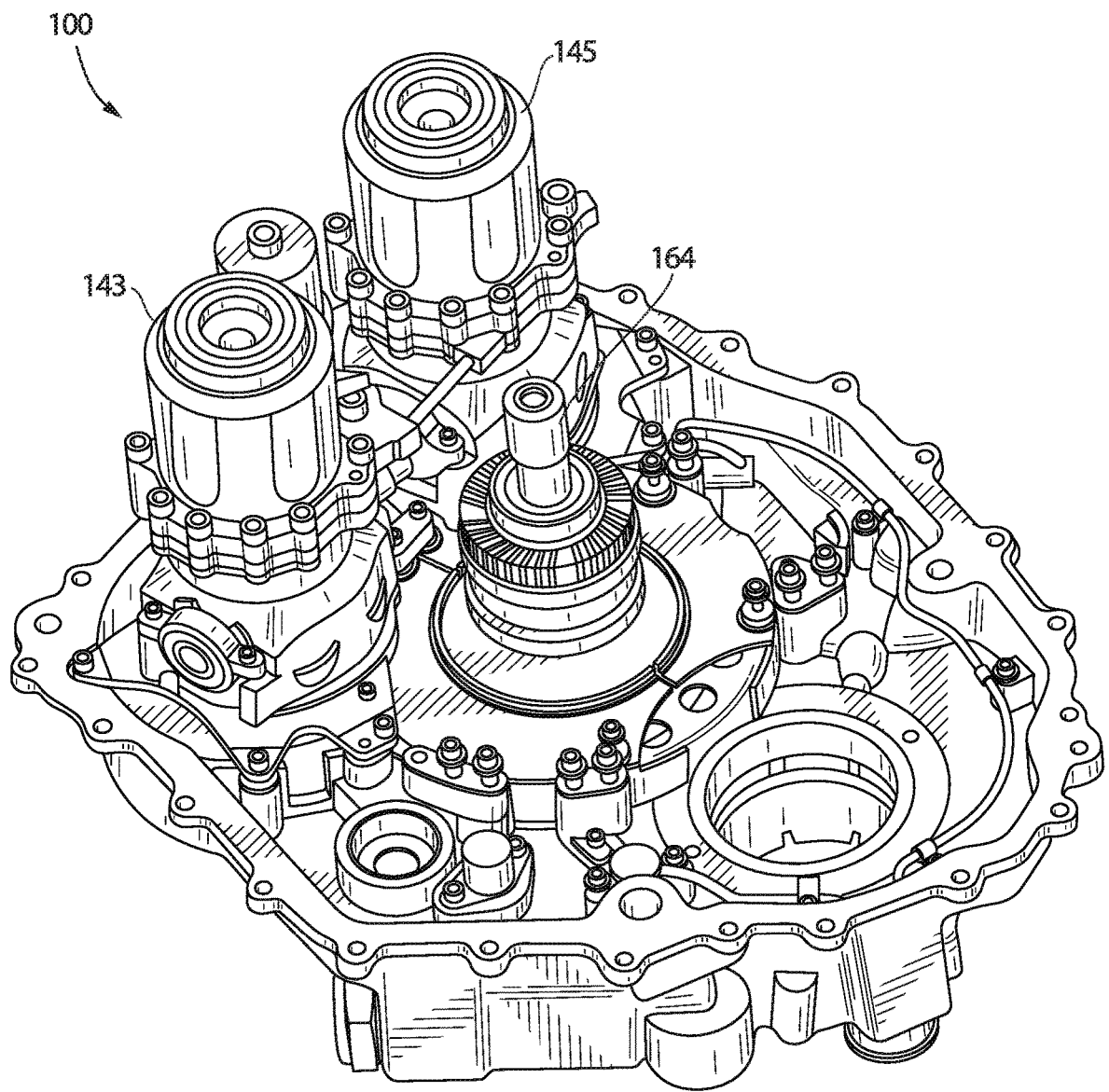
FIG. 5 is a perspective view of the gear shroud arrangement of FIG. 4, showing two hydraulic transmission units and a differential unit engaged in the IDG housing.
Figure 6:
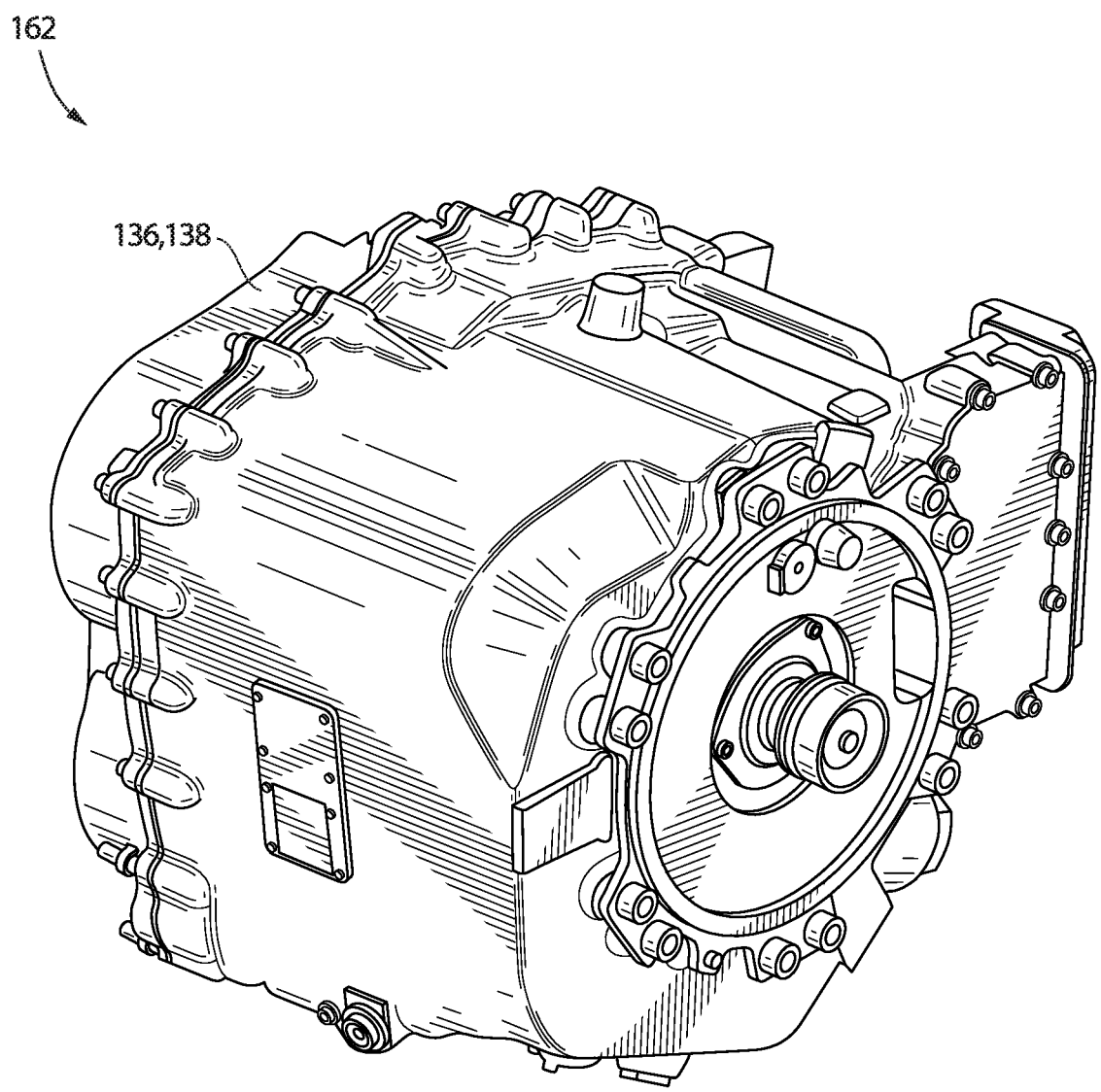
FIG. 6 is a perspective view of the IDG housing of FIG. 5.

Referring now to FIG. 4, an IDG housing 136 is included, wherein the mounting flange 130 of FIG. 2B is engaged to an outer housing wall 138 of the IDG housing 136 using a fastener 140. The mounting plate 102 defines a plurality of fastener apertures therethrough 142, identified in FIG. 1. A differential unit 164 is mounted to the mounting plate 102 by fasteners 140 engaged in the fastener apertures 142. The mounting plate 102, first shroud 106, second shroud 114, and backing plate 112 form a first gear shroud portion 168 and an opposed gear shroud portion 166 is engaged with the first gear shroud portion 168 and with the differential unit 164 to form a complete gear shroud for the differential unit 164. Each of the mounting plate 102 and backing plate 112 of each of the gear shroud portions 160, 168 includes a concave notch 170 proximate the 12 o'clock position, as shown in FIGS. 1 and 2A, exposing the gear 152 of the differential unit 164. As shown in FIG. 4, a portion 158 of a differential shroud portion 168 extends within the aperture 156 of the hydraulic unit shroud 157. In FIG. 5, two hydraulic units 143 and 145 are mounted in parallel with the differential unit 164. As shown in FIG. 6, when fully assembled, the outer housing wall 138 of the IDG housing 136 surrounds the components shown in FIGS. 4-5 and forms an IDG 162.

The methods and systems of the present disclosure, as described above and shown in the drawings, provide for gear shrouds with superior properties including reducing the amount of oil churning, which improves IDG efficiency and scavenge pump performance, thus improving the IDG oil servicing range. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A gear shroud arrangement comprising:
a mounting plate defining an aperture therethrough;
a first cylindrical shroud having a first end and an opposed second end, wherein the first end of the first cylindrical shroud is connected to an outer periphery of the mounting plate and is aligned with the aperture;
a backing plate mounted to the second end of the first cylindrical shroud; and
a second cylindrical shroud extending from the backing plate in a direction opposite the first cylindrical shroud, wherein the first cylindrical shroud extends clockwise from a first position between a 12 o'clock position and a 1 o'clock position as viewed toward the mounting plate and a 6 o'clock position relative to the 12 o'clock position, wherein the second cylindrical shroud extends clockwise from the 12 o'clock position as viewed toward the mounting plate and a position between a 3 o'clock position and a 4 o'clock position relative to the 12 o'clock position.

2. The arrangement as recited in claim 1, wherein the mounting plate defines an off-center aperture therethrough between a 3 o'clock position and a 6 o'clock position relative to the 12 o'clock position.

3. The arrangement as recited in claim 2, wherein the off-center aperture has a generally lunate shape with a nose extending toward a center axis of the mounting plate from the generally lunate shape.

4. The arrangement as recited in claim 1, wherein the mounting plate includes a partial riser tube extending about the aperture and extending in a direction away from the backing plate.

5. The arrangement as recited in claim 1, wherein the second cylindrical shroud includes a first step and a second step extending further from the backing plate than the first step.

6. The arrangement as recited in claim 5, wherein the first and second steps meet at a position between the 12 o'clock position and a 1 o'clock position relative to the 12 o'clock position.

7. The arrangement as recited in claim 6, wherein the second step extends clock-wise from the first step.

8. A gear shroud arrangement comprising:
a mounting plate defining an aperture therethrough;
a first cylindrical shroud having a first end and an opposed second end, wherein the first end of the first cylindrical shroud is connected to an outer periphery of the mounting plate and is aligned with the aperture;
a backing plate mounted to the second end of the first cylindrical shroud; and
a second cylindrical shroud extending from the backing plate in a direction opposite the first cylindrical shroud, wherein the second cylindrical shroud includes a first step and a second step extending further from the backing plate than the first step, wherein the first and second steps meet at a position between the 12 o'clock position and a 1 o'clock position relative to the 12 o'clock position, wherein the second step extends clock-wise from the first step, wherein a mounting flange with a fastener aperture extends from the second cylindrical shroud where the first and second steps meet.

9. The arrangement as recited in claim 8, further comprising an integrated drive generator (IDG) housing, wherein the mounting flange is engaged to an outer housing wall of the IDG housing.

10. The arrangement as recited in claim 9, wherein the mounting plate defines a plurality of fastener apertures therethrough, and further comprising a differential unit mounted to the mounting plate by fasteners engaged in the fastener apertures.

11. The arrangement as recited in claim 10, wherein the mounting plate, first cylindrical shroud, second cylindrical shroud, and backing plate form a first gear shroud portion and further comprising an opposed gear shroud portion engaged with the first gear shroud portion and with the differential unit to form a complete gear shroud for the differential unit.

12. The arrangement as recited in claim 11, wherein the opposed gear shroud portion and each of the mounting plate and backing plate of the first gear shroud portion includes a concave notch proximate the 12 o'clock position.

13. A gear shroud arrangement comprising:
a mounting plate defining an aperture therethrough;
a first cylindrical shroud having a first end and an opposed second end, wherein the first end of the first cylindrical shroud is connected to an outer periphery of the mounting plate and is aligned with the aperture;
a backing plate mounted to the second end of the first cylindrical shroud; and
a second cylindrical shroud extending from the backing plate in a direction opposite the first cylindrical shroud, wherein the first cylindrical shroud extends clockwise from a first position between a 12 o'clock position and a 1 o'clock position as viewed toward the mounting plate and a 6 o'clock position relative to the 12 o'clock position, wherein the mounting plate defines an off-center aperture therethrough between a 3 o'clock position and a 6 o'clock position relative to the 12 o'clock position.

14. A gear shroud arrangement comprising:
a mounting plate defining an aperture therethrough;
a first cylindrical shroud having a first end and an opposed second end, wherein the first end of the first cylindrical shroud is connected to an outer periphery of the mounting plate and is aligned with the aperture;
a backing plate mounted to the second end of the first cylindrical shroud; and
a second cylindrical shroud extending from the backing plate in a direction opposite the first cylindrical shroud, wherein the second cylindrical shroud includes a first step and a second step extending further from the backing plate than the first step, wherein the first and second steps meet at a position between the 12 o'clock position and a 1 o'clock position relative to the 12 o'clock position, wherein the second step extends clock-wise from the first step.

* * * * *